(12) United States Patent
Zalmanovitch et al.

(10) Patent No.: US 8,977,231 B2
(45) Date of Patent: Mar. 10, 2015

(54) TRACKING DATA USAGE UNDER A SCHEMATIZED DATA PLAN

(71) Applicant: Microsoft Corporation, Redmond, WA (US)

(72) Inventors: Gil Zalmanovitch, Seattle, WA (US); Gregory James Scott, Seattle, WA (US); Shai Guday, Redmond, WA (US); Alec Garvin Kwok, Redmond, WA (US); Yue Jiang, Redmond, WA (US); Kenneth Vincent Ma, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 13/721,053

(22) Filed: Dec. 20, 2012

(65) Prior Publication Data

US 2013/0196618 A1   Aug. 1, 2013

Related U.S. Application Data

(60) Provisional application No. 61/696,472, filed on Sep. 4, 2012, provisional application No. 61/591,503, filed on Jan. 27, 2012, provisional application No. 61/591,509, filed on Jan. 27, 2012.

(51) Int. Cl.
*H04W 4/26* (2009.01)
*H04W 24/02* (2009.01)
(Continued)

(52) U.S. Cl.
CPC .......... *H04W 4/26* (2013.01); *H04W 24/02* (2013.01); *H04L 43/04* (2013.01); *H04M 15/58* (2013.01); *H04L 43/0876* (2013.01); *H04L 12/1435* (2013.01); *H04M 15/83* (2013.01); *H04M 15/84* (2013.01); *H04M 15/846* (2013.01); *H04M 15/85* (2013.01); *H04M 15/86* (2013.01);
(Continued)

(58) Field of Classification Search
USPC ............................. 455/405, 406, 466, 414.1
See application file for complete search history.

(56) References Cited

U.S. PATENT DOCUMENTS 6,308,328 B1   10/2001   Bowcutt et al.
7,184,749 B2   2/2007    Marsh et al.
(Continued)

FOREIGN PATENT DOCUMENTS

WO   2008/097105 A1   8/2008
WO   2012/162419 A2   11/2012

OTHER PUBLICATIONS

"International Search Report", Mailed Date: May 15, 2013, Application No. PCT/US2013/022353, pp. 10.
(Continued)

*Primary Examiner* — David Q Nguyen
(74) *Attorney, Agent, or Firm* — John Jardine; Kate Drakos; Micky Minhas

(57) ABSTRACT

Embodiments provide a schema for representing data usage plans and data usage statistics. The data usage plan describes threshold values associated with network connections of computing devices of the user. A web service dynamically generates data usage statistics for the computing devices to represent data consumed by the computing devices under the data usage plan. The schema is updated with the data usage statistics and distributed to the computing devices for presentation to the user.

20 Claims, 6 Drawing Sheets

(51) Int. Cl.
*H04L 12/26* (2006.01)
*H04M 15/00* (2006.01)
*H04L 12/14* (2006.01)
*H04W 8/18* (2009.01)
*H04M 1/725* (2006.01)

(52) U.S. Cl.
CPC ............... *H04L43/045* (2013.01); *H04W 8/18* (2013.01); *H04M 1/72522* (2013.01); *H04M 15/775* (2013.01); *H04M 15/8044* (2013.01); *H04M 15/854* (2013.01); *H04M 15/856* (2013.01)
USPC ........ 455/405; 455/406; 455/466; 455/414.1; 705/30; 705/304

(56) References Cited

U.S. PATENT DOCUMENTS

| | | | |
|---|---|---|---|
| 7,277,938 | B2 | 10/2007 | Duimovich et al. |
| 7,320,131 | B1 | 1/2008 | O'toole, Jr. |
| 7,406,596 | B2 | 7/2008 | Tararukhina et al. |
| 7,418,532 | B2 | 8/2008 | Suzuki et al. |
| 7,720,727 | B2 | 5/2010 | Keyes et al. |
| 7,904,080 | B2 | 3/2011 | Atkins et al. |
| 7,986,935 | B1 | 7/2011 | D'souza et al. |
| 8,064,876 | B2 | 11/2011 | Knight |
| 8,359,389 | B1* | 1/2013 | Cohen et al. ............. 709/224 |
| 8,484,568 | B2 | 7/2013 | Rados et al. |
| 2002/0029273 | A1 | 3/2002 | Haroldson et al. |
| 2002/0082991 | A1 | 6/2002 | Friedman et al. |
| 2003/0066055 | A1 | 4/2003 | Spivey |
| 2003/0115815 | A1 | 6/2003 | Adamane et al. |
| 2004/0111712 | A1 | 6/2004 | Humpert et al. |
| 2004/0153587 | A1 | 8/2004 | Choi |
| 2004/0176965 | A1 | 9/2004 | Winch et al. |
| 2004/0199634 | A1 | 10/2004 | Jackowski et al. |
| 2006/0141983 | A1 | 6/2006 | Jagannathan et al. |
| 2006/0211404 | A1 | 9/2006 | Cromp et al. |
| 2007/0211674 | A1 | 9/2007 | Ragnar Karlberg et al. |
| 2008/0318621 | A1 | 12/2008 | Fan et al. |
| 2009/0054030 | A1 | 2/2009 | Golds |
| 2009/0068980 | A1 | 3/2009 | Creswell et al. |
| 2009/0068984 | A1 | 3/2009 | Burnett |
| 2009/0138427 | A1 | 5/2009 | Kalavade |
| 2009/0172275 | A1 | 7/2009 | Nochimowski et al. |
| 2009/0196302 | A1 | 8/2009 | Pastorino et al. |
| 2009/0199196 | A1 | 8/2009 | Peracha |
| 2009/0203352 | A1 | 8/2009 | Fordon et al. |
| 2009/0285201 | A1 | 11/2009 | Ben-haim et al. |
| 2010/0015926 | A1 | 1/2010 | Luff |
| 2010/0017506 | A1 | 1/2010 | Fadell |
| 2010/0035576 | A1 | 2/2010 | Jones et al. |
| 2010/0180190 | A1 | 7/2010 | Carroll |
| 2010/0191612 | A1 | 7/2010 | Raleigh |
| 2010/0318647 | A1 | 12/2010 | Savoor et al. |
| 2011/0019566 | A1 | 1/2011 | Leemet et al. |
| 2011/0137776 | A1 | 6/2011 | Goad et al. |
| 2011/0145920 | A1 | 6/2011 | Mahaffey et al. |
| 2011/0151831 | A1 | 6/2011 | Pattabiraman |
| 2011/0176482 | A1 | 7/2011 | Vizor et al. |
| 2011/0211465 | A1 | 9/2011 | Farrugia et al. |
| 2011/0231551 | A1 | 9/2011 | Hassan et al. |
| 2011/0238826 | A1 | 9/2011 | Carre et al. |
| 2011/0244826 | A1 | 10/2011 | Krishnan et al. |
| 2011/0275344 | A1 | 11/2011 | Momtahan et al. |
| 2011/0276442 | A1* | 11/2011 | Momtahan et al. ............. 705/30 |
| 2012/0054661 | A1 | 3/2012 | Rados et al. |
| 2012/0101952 | A1* | 4/2012 | Raleigh et al. ................ 705/304 |
| 2012/0142310 | A1 | 6/2012 | Pugh et al. |
| 2012/0208495 | A1 | 8/2012 | Lawson et al. |
| 2012/0278194 | A1 | 11/2012 | Dewan et al. |
| 2013/0023230 | A9* | 1/2013 | Momtahan et al. ........... 455/405 |
| 2013/0117846 | A1 | 5/2013 | Mahaffey et al. |
| 2013/0122882 | A1 | 5/2013 | Patel et al. |

OTHER PUBLICATIONS

Heikkinen, et al., "Measuring Mobile Peer-to-Peer Usage: Case Finland 2007", Retrieved at <<http://pam2009.kaist.ac.kr/paper/54480165.pdf>>, Proceedings of the Passive and Active Measurement conference, Seoul, South Korea Apr. 1-3, 2009, pp. 165-174.

Sinofsky, Steven., "Engineering Windows 8 for mobile networks", Retrieved at <<http://blogs.msdn.com/b/b8/archive/2012/01/20/engineering-windows-8-for-mobility.aspx>>, Jan. 20, 2012, pp. 28.

Blass, Evan., "Exclusive: Windows Phone 8 Detailed", Retrieved at <<http://pocketnow.com/windows-phone/exclusive-windows-phone-8-detailed>>, Feb. 2, 2012, pp. 2.

"International Search Report & Written Opinion for PCT Patent Application No. PCT/US2013/022822", Mailed Date: Apr. 25, 2013, Filed Date: Jan. 24, 2013, 9 pages.

Heinz II, Gerard J., "Priorities in Stream Transmission Control Protocol (SCTP) Multistreaming", A Thesis Submitted to the Faculty of the University of Delaware in Partial Fulfillment of the Requirements for the Degree of Master of Degree in Computer and Information Science, 2003, 35 pages.

Balasubramanian, Aruna, "Architecting Protocols to Enable Mobile Applications in Diverse Wireless Networks", A Dissertations and Theses, University of Massachusetts, Amherst, Feb. 2011, 198 pages.

Peddemors, Arjan, "Network Resource Awareness and Prediction on Mobile Devices", In Novay PhD Research Series, No. 026 (Novay/PRS/026), Oct. 2009, 236 pages.

"Rapid Mobile Data Service Creation and Monetization", Published on: Oct. 2, 2012, Available at: http://www.amdocs.com/Products/network-control/Documents/data-experience-solution-datasheet.pdf, 7 pages.

Unuth, Nadeem, "Data Usage Monitor Apps for Your iPhone and iPad", Retrieved on: Oct. 8, 2012, Available at: http://voip.about.com/od/voipbandwidth/tp/Data-Usage-Monitor-Apps-For-Your-Iphone-And-Ipad.htm, 1 page.

"Non-Final Office Action Received for U.S. Appl. No. 13/721,041", Mailed Date: Mar. 28, 2014, Filed Date: Dec. 20, 2012, 14 pages.

"Non-Final Office Action Received for U.S. Appl. No. 13/721,069", Mailed Date: Mar. 14, 2014, Filed Date: Dec. 20, 2012, 14 pages.

"Non-Final Office Action Received for U.S. Appl. No. 13/721,029", Mailed Date: Mar. 11, 2014, Filed Date: Dec. 20, 2012, 13 pages.

"Non-Final Office Action Received for U.S. Appl. No. 13/721,023", Mailed Date: Mar. 28, 2014, Filed Date: Dec. 20, 2012, 15 pages.

"Non-Final Office Action Received for U.S. Appl. No. 13/721,032", Mailed Date: Feb. 6, 2014, Filed Date: Dec. 20, 2012, 10 pages.

"Non-Final Office Action Received for U.S. Appl. No. 13/721,058", Mailed Date: Apr. 16, 2014, Filed Date: Dec. 20, 2012, 10 pages.

"Non-Final Office Action for U.S. Appl. No. 13/721,032", Mailed Date: Aug. 5, 2014, Filed Date: Dec. 20, 2012, 16 pages.

"Supplementary Search Report Issued in European Patent Application No. 13741633.5", Mailed Date: Sep. 18, 2014, 3 pages.

\* cited by examiner

FIG. 5A

DATASMART
overview by app

Monthly Limit — 502

October 21, 2011 - now

DATA AVAILABLE* 136 of 200 MB

DAYS AVAILABLE 13 of 30 days

CELLULAR VS. WIFI
- 21% on cellular* 136 MB
- 79% on wifi 514 MB

FIG. 5B

DATASMART
overview by app

Pay-as-you-go — 504

DATA AVAILABLE* 136 MB

Expires in 16 days

CELLULAR VS. WIFI    Last 30 days
- 21% on cellular* 136 MB
- 79% on wifi 514 MB

FIG. 5C

DATASMART
overview by app

Unlimited/None — 506

CELLULAR VS. WIFI    Last 30 days
- 21% on cellular* 136 MB
- 79% on wifi 514 MB

TOTAL USAGE
640 MB

TRACKING DATA USAGE UNDER A SCHEMATIZED DATA PLAN

CROSS-REFERENCE TO RELATED APPLICATIONS

This application claims the benefit of U.S. Provisional Application No. 61/696,472, filed Sep. 4, 2012, U.S. Provisional Application No. 61/591,503, filed Jan. 27, 2012, and U.S. Provisional Application No. 61/591,509, filed Jan. 27, 2012. The entirety of these provisional applications is hereby incorporated by reference herein.

This application is related to the following applications: U.S. Patent Application entitled "Managing Data Transfers Over Network Connections Based on Priority and a Data Usage Plan," U.S. Patent Application entitled "On-Device Attribution of Network Data Usage," U.S. Patent Application entitled "Predicting Network Data Consumption Relative to Data Usage Patterns," U.S. Patent Application entitled "Updating Dynamic Data Usage Plans and Statistics," U.S. Patent Application entitled "Data Usage Profiles for Users and Applications," U.S. Patent Application entitled "Recommendations for Reducing Data Consumption Based on Data Usage Profiles," U.S. Patent Application entitled "Dynamically Adjusting a Data Usage Plan Based on Data Usage Statistics," and U.S. Patent Application entitled "Managing Network Data Transfers in View of Multiple Data Usage Plans." All of these applications are incorporated by reference herein in their entirety.

BACKGROUND

With the increased popularity of smart telephones, tablets, and other mobile devices, there has been a similar increase in the amount of data handled by the networks of mobile operators. To reduce the strain on network infrastructure and to reduce network transfer costs, mobile operators are shifting from offering unlimited mobile data plans to offering capped and metered plans. With some of the capped and metered plans, the fees for exceeding the allotted data caps may be significant. While some existing web browsers attempt to optimize data traffic, the existing systems generally lack mechanisms for balancing specific needs of each user with data transfer costs. Further, some of the existing systems are unable to accurately track and attribute the amount of data consumed under the plans.

As a result, with the existing systems, users can unknowingly exceed the allotted data caps and experience bandwidth throttling (e.g., a reduction or limit placed upon the rate of consumption) and/or be presented with a much larger than normal monthly bill, resulting in "bill shock." Throttling and bill shock can impact the user experience, leading to dissatisfied customers, increased customer service calls, and negative impressions of the mobile operators.

SUMMARY

Embodiments of the disclosure generate and represent data usage statistics with a schema. The schema represents a data usage plan associated with at least one user. The data usage plan describes threshold values associated with network connections of a plurality of computing devices of the user. The web service collects data from a mobile operator and/or the plurality of computing devices of the user. The data usage statistics are generated from the collected data, and represent data consumed under the data usage plan. The schema is updated with the generated data usage statistics and distributed to the plurality of the computing devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5A is an exemplary user interface illustrating data usage by a mobile computing device consuming network data under a data usage plan with a monthly limit.

FIG. 5B is an exemplary user interface illustrating data usage by a mobile computing device consuming network data under a pay-as-you-go data usage plan.

FIG. 5C is an exemplary user interface illustrating data usage by a mobile computing device consuming network data under a data usage plan with unlimited data usage.

Corresponding reference characters indicate corresponding parts throughout the drawings.

DETAILED DESCRIPTION

Figure 1:
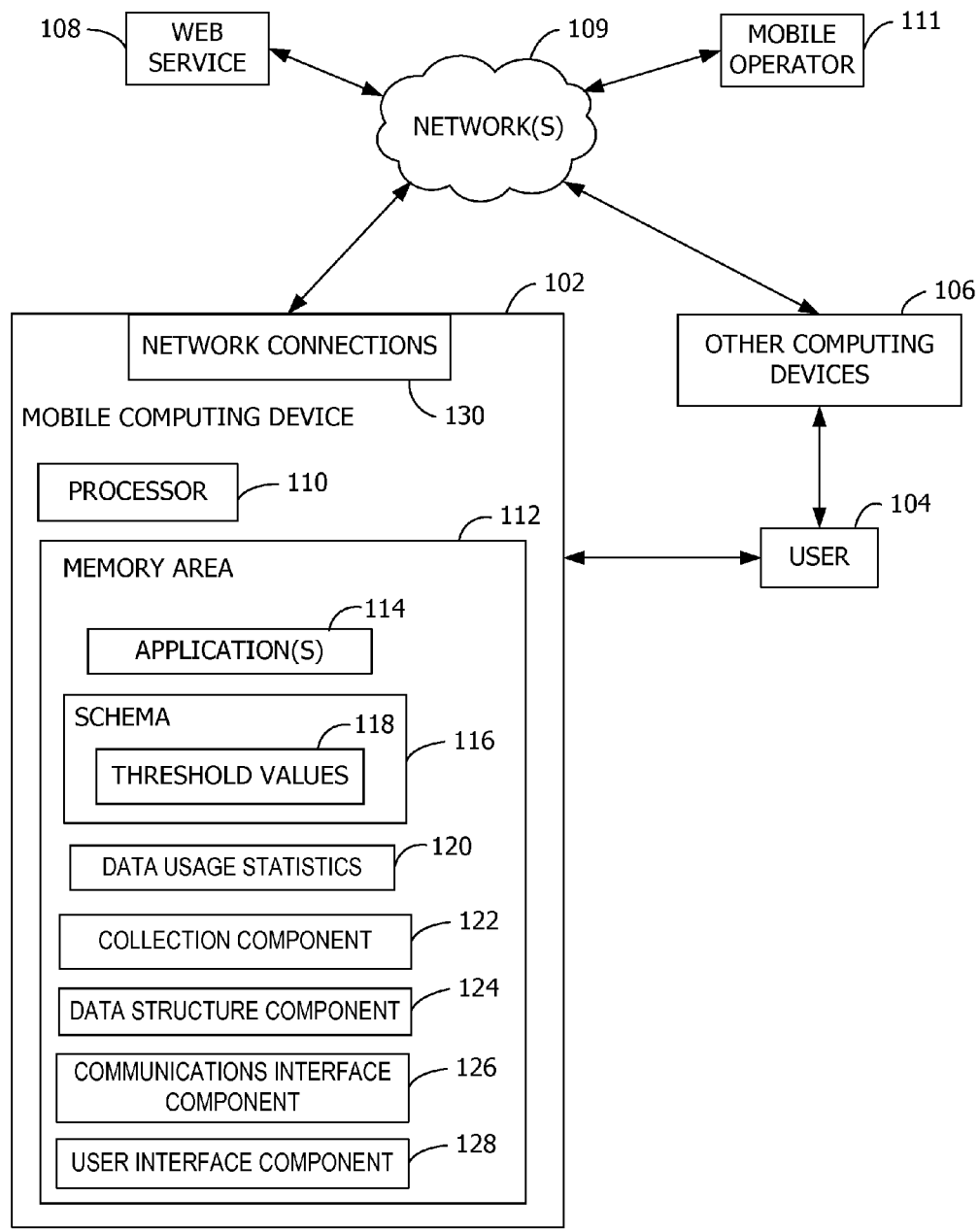
FIG. 1 is an exemplary block diagram illustrating user computing devices communicating over one or more networks.

Referring to the figures, embodiments of the disclosure enable the collection into a schema 116 of data relating to network transfers by a plurality of computing devices. In some embodiments, a centralized service such as a web service 108 monitors data consumption by one or more of the computing devices under a data usage plan. For example, the web service 108 may receive data usage statistics 120 from the computing devices and/or from one or more mobile operators 111 associated with the data usage plan. The web service 108 presents the data usage statistics 120 to a user 104 relative to threshold values 118 associated with the data usage plan to provide the user 104 with an indication of the data usage and trending. In other embodiments, the computing devices, such as a mobile computing device 102, generate the data usage statistics 120 for presentation to the user 104.

Aspects of the disclosure employ the schema 116 such as an extensible markup language (XML) schema to represent the data usage plan and, in some embodiments, to represent the data usage statistics 120. The schema 116 enables descriptions of the parts, components, services, features, or other aspects of the data usage plan including, but not limited to, multi-rate data plans, peak times, roaming rates, allotted data consumption per network connection 130, etc. In some embodiments, the schema 116 allows the mobile operators 111 to send out updated portions of the schema 116 corresponding to updated parts of the data usage plan.

Referring to FIG. 1, an exemplary block diagram illustrates user computing devices communicating over one or more networks 109. In some embodiments, one or more of the user computing devices are associated with a data usage plan. For example, a plurality of the user computing devices may share data allotted under the same or common data usage plan.

The user computing devices include any device executing instructions (e.g., as application programs, operating system functionality, or both) to implement operations and functionality. The user computing devices may include, for example, the mobile computing device 102 or any other portable device. In some embodiments, the mobile computing device 102 includes a mobile telephone, laptop, tablet, computing pad, netbook, gaming device, e-reader, and/or portable media player. Other computing devices 106 may include less portable devices such as desktop personal computers, kiosks, and tabletop devices that have network connectivity capabilities. Additionally, each user computing device may represent a group of processing units. While aspects of the disclosure may be described herein with reference to the mobile computing device 102, the descriptions are applicable to any of the user computing devices.

Communication between the mobile computing device 102 and other devices may occur using any protocol or mechanism over one or more of the networks 109. The networks 109 represent any infrastructure or other means for sending and/or receiving data. The networks 109 may include wired and/or wireless networks.

The user computing devices communicate with the web service 108, or other entity that tracks network data consumption by the user computing devices. Further, one or more of the mobile operators 111 communicate with the web service 108 and/or the user computing devices.

In some embodiments, the mobile computing device 102 has at least one processor 110 and a memory area 112. The processor 110 includes any quantity of processing units, and is programmed to execute computer-executable instructions for implementing aspects of the disclosure. The instructions may be performed by the processor 110 or by multiple processors executing within the mobile computing device 102, or performed by a processor external to the mobile computing device 102. In some embodiments, the processor 110 is programmed to execute instructions such as those illustrated in the figures (e.g., FIG. 3).

In some embodiments, the processor 110 represents an implementation of analog techniques to perform the operations described herein. For example, the operations may be performed by an analog computing device and/or a digital computing device.

The mobile computing device 102 further has one or more computer readable media such as the memory area 112. The memory area 112 includes any quantity of media associated with or accessible by the mobile computing device 102. The memory area 112 may be internal to the mobile computing device 102 (as shown in FIG. 1), external to the mobile computing device 102 (not shown), or both (not shown). In some embodiments, the memory area 112 includes read-only memory and/or memory wired into an analog computing device.

The memory area 112 stores, among other data, one or more applications 114. The applications 114, when executed by the processor 110, operate to perform functionality on the mobile computing device 102. Exemplary applications 114 include mail application programs, web browsers, calendar application programs, address book application programs, messaging programs, media applications, location-based services, search programs, and the like. The applications 114 may communicate with counterpart applications or services such as the web services 108 accessible via the network 109. For example, the applications 114 may represent downloaded client-side applications that correspond to server-side services executing in a cloud.

The memory area 112 further stores at least one schema 116. The schema 116 represents a data usage plan associated with the user 104, and may be populated with the data usage statistics 120. For example, the user 104 has contracted with the mobile operator 111 to receive network transfer services from the mobile operator 111. The data usage plan describes the services provided by the mobile operator 111, such as the amount of network data the user 104 can consume during a particular duration (e.g., a billing time period). For example, the data usage plan describes threshold values 118 associated with network connections 130 of one or more devices of the user 104. The network connections 130 represent communication channels or other means for sending and/or receiving data over the network 109. Exemplary network connections 130 include, but are not limited to, Wi-Fi, cellular, tethered, BLUETOOTH brand communication, near-field communication (NFC), and more. The network connections 130 may also be categorized into voice, text, data, or other categories or types of network traffic. The threshold values 118 represent the maximum amount of data consumption allotted for the network connections 130. For example, one threshold value 118 may indicate the maximum amount of data consumption for a Wi-Fi connection, while another threshold value 118 indicates a maximum amount of data consumption for a cellular data connection.

Aspects of the disclosure are operable with any quantity of populated schemas 116. Each of the populated schemas 116 is associated with a different data usage plan, For example, the mobile computing device 102 may have more than one cellular connection, and each of the cellular connections work independently (e.g., multiple radios operating independently of each other). In such embodiments, there may be multiple data usage plans active per cellular connection. Exemplary environments include dual subscriber identity module (SIM) dual active devices (both connections independently active) or dual SIM dual standby devices (one connection is in a standby mode). Additional examples include virtual SIMs, universal integrated circuit cards (UICCs), and other variants of user identity modules.

In some embodiments, the schema 116 includes a plurality of fields. Each of the threshold values 118 may be associated with one or more of the fields. For example, the fields may correspond to one or more of the following: peak times, off-peak times, peak time data consumption quota, off-peak time data consumption quota, peak time data consumption remaining, off-peak time data consumption remaining, a roaming rate and rules, a mobile operator name, a billing cycle type, a network connection type, identification of free or reduced-cost hosts available for connection, a list of mobile hotspots, and any other elements or information pertaining to the data usage plan. The set of free or reduced-cost hosts represents zero-rated or other reduced cost hosts (e.g., visiting particular web sites does not count against the data usage plan) or data types (e.g., multimedia messaging service data). In some embodiments, the zero-rated or reduced-cost hosts or data may be identified in a form of a blacklist.

The schema 116 may also include fields supporting different billing rates per host accessed, and allow each mobile operator 111 the flexibility to define complex plans including broadly offered plans, and dynamic, short-term offers to specific users 104 likely to use a specific part or parts of the overall services. Other offers based on any combination of the metrics obtained are available to the mobile operator 111.

The schema 116 may also include fields corresponding to the data usage statistics 120 collected or generated by the mobile computing device 102, the web service 108, and/or the mobile operator 111.

While the schema 116 may take any form or structure, the schema 116 may be implemented as XML schema. Appendix A includes an exemplary XML schema for use in aspects of the disclosure.

The data usage statistics 120 identify, to a granularity of time (e.g., per minute) or data (e.g., per kilobyte), how much data has been sent and/or received by the mobile computing device 102 or the other computing devices 106, and over which network connections 130. Other data usage statistics 120 are contemplated, however. The data usage statistics 120 may be generated by the mobile computing device 102, by the web service 108, and/or by the mobile operator 111. For example, the mobile computing device 102 may collect the data usage statistics 120 representing network data consumed by the mobile computing device 102, and then update the data usage statistics 120 with information received from the web service 108 representing network data consumed by the other computing devices 106 of the user 104 (e.g., associated with the same data usage plan).

In some embodiments, if the web service 108 detects that the mobile computing device 102 has old or outdated data usage statistics 120, the web service 108 may send a notification to the mobile computing device 102 to synchronize the data usage statistics 120 directly with the mobile operator 111 or with the web service 108.

The memory area 112 further stores one or more computer-executable components. Exemplary components include a collection component 122, a data structure component 124, a communications interface component 126, and a user interface component 128. Operation of the components, when executed, is described below with reference to FIG. 3.

In some embodiments, the communications interface component 126 includes a network interface card and/or computer-executable instructions (e.g., a driver) for operating the network interface card. In some embodiments, the communications interface is operable with near-field communication (NFC) tags.

The user interface component 128 may include a graphics card for displaying data to the user 104 and receiving data from the user 104. The user interface component 128 may also include computer-executable instructions (e.g., a driver) for operating the graphics card. Further, the user interface component 128 may include a display (e.g., a touch screen display or natural user interface) and/or computer-executable instructions (e.g., a driver) for operating the display. The user interface component 128 may also include one or more of the following to provide data to the user 104 or receive data from the user 104: speakers, a sound card, a camera, a microphone, a vibration motor, one or more accelerometers, a BLUETOOTH brand communication module, global positioning system (GPS) hardware, and a photoreceptive light sensor. For example, the user 104 may input commands or manipulate data by moving the computing device in a particular way.

Figure 2:
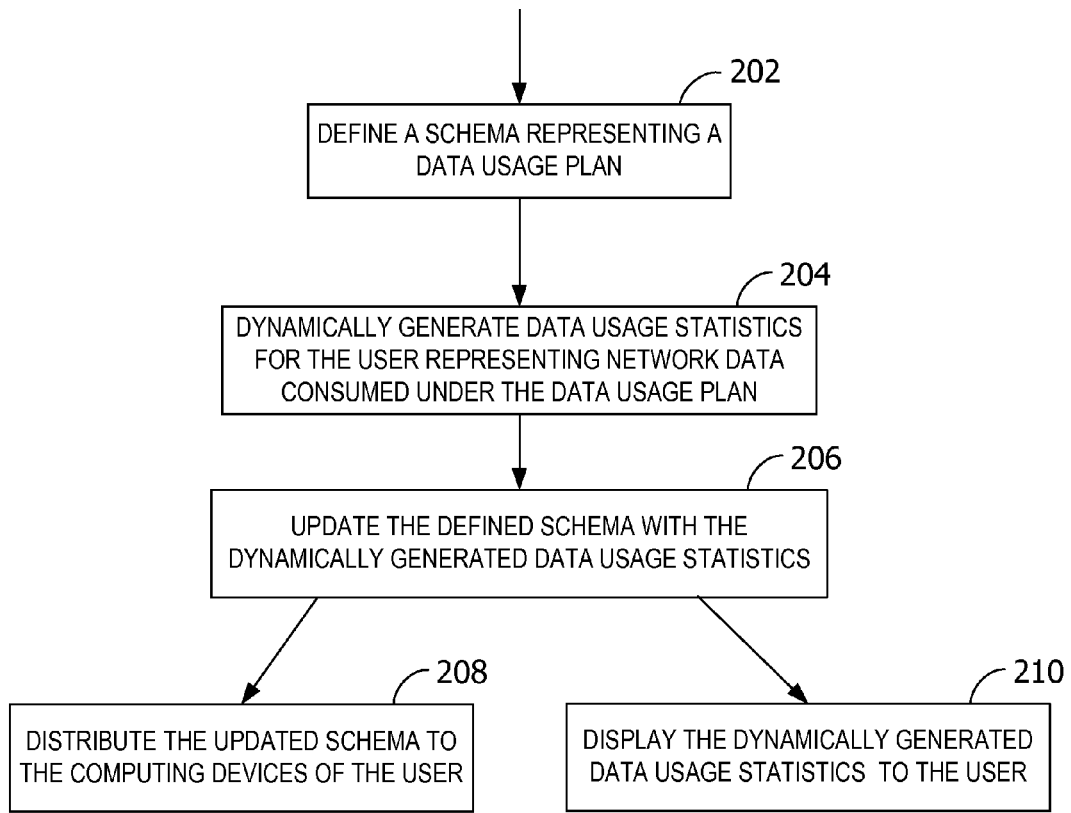
FIG. 2 is an exemplary flow chart illustrating operation of a web service to track network data consumed by a plurality of user computing devices under a data usage plan.

Referring next to FIG. 2, an exemplary flow chart illustrates operation of the web service 108 to track network data consumed by the user computing devices under the data usage plan. At 202, the web service 108 defines the schema 116 representing the data usage plan. Defining the schema 116 includes, for example, defining the schema 116 for use by the mobile operator 111. Alternatively or in addition, defining the schema 116 includes receiving the schema 116 from the mobile operator 111. The schema 116 represents the data usage plan associated with one or more of the users 104.

At 204, the web service 108 dynamically generates the data usage statistics 120 for the user 104. The data usage statistics 120 represent data consumed under the data usage plan by one or more of the computing devices associated with the user 104. The data usage statistics 120 may be viewed as a current or instant snapshot of the amount of data transmitted and/or received by the computing devices of the user 104 that share the data usage plan. The web service 108 may collect information relating to text messages, voice calls, minutes used, voice over Internet Protocol (VoIP) usage, and any other element of usage consumed by, or that impacts, the user computing devices to produce the data usage statistics 120.

Dynamically generating the data usage statistics 120 may include receiving data from the user computing devices and/or from the mobile operator 111. The data corresponds to at least a portion of the data usage statistics 120 and may be received in a format that conforms to the schema 116. For example, the mobile operator 111 may have more current and/or more accurate data usage statistics 120 for one or more of the user computing devices than the user computing devices. As another example, the mobile operator 111 may have more current and/or more accurate data usage statistics 120 for some of the network connections 130 than the user computing devices. The mobile operator 111 may push, or transmit upon demand, such data usage statistics 120 to the web service 108. The web service 108 integrates the data from the mobile operator 111 and/or the user computing devices to produce the data usage statistics 120.

The web service 108 may further generate the data usage statistics 120 by comparing data collected from the mobile operators 111 to data collected from the user computing devices. For example, the web service 108 may receive first data corresponding to at least a portion of the data usage statistics 120 from the mobile operator 111, and receive second data corresponding to at least a portion of the data usage statistics 120 from one or more of the user computing devices. If differences exist (e.g., the data from the mobile operator 111 may be 24-48 hours old), the web service 108 reconciles the differences to provide the user 104 with the most current information. Continuing the example from above, the web service 108 may reconcile the received first data and the received second data to produce the dynamically generated data usage statistics.

Reconciling the differences in data received from the mobile operators 111 and/or the user computing devices includes, for example, examining time stamps or other collection dates and favoring, weighting, or choosing the more recently collected data. Continuing the above example, reconciling the received first data and the received second data includes, for example, comparing a timestamp associated with the received first data and a timestamp associated with the received second data. The web service 108 may integrate the data having the later, or more recent, timestamp into the data usage statistics 120.

At 206, the web service 108 updates the defined schema 116 with the dynamically generated data usage statistics 120. For example, the web service 108 populates a data structure conforming to the defined schema 116 with the data usage statistics 120. At 208, the web service 108 distributes the updated schema 116 to the plurality of computing devices of the user 104 that share the same data usage plan. The plurality of computing devices may then update any locally stored copies of the data usage statistics 120 to reflect the current or up-to-date network data consumed under the data usage plan.

At 210, the web service 108 may display the data usage statistics 120 to the user 104. For example, the data usage statistics 120 may be displayed to the user 104 in various user interfaces (e.g., see FIG. 4, FIG. 5A, FIG. 5B, FIG. 5C, and FIG. 6).

While FIG. 2 illustrates the example scenario of the web service 108 collecting the data usage statistics 120, updating the schema 116, and distributing the schema 116 to the user computing devices, similar operations may be performed by the user computing devices, as next described with reference to FIG. 3.

Figure 3:
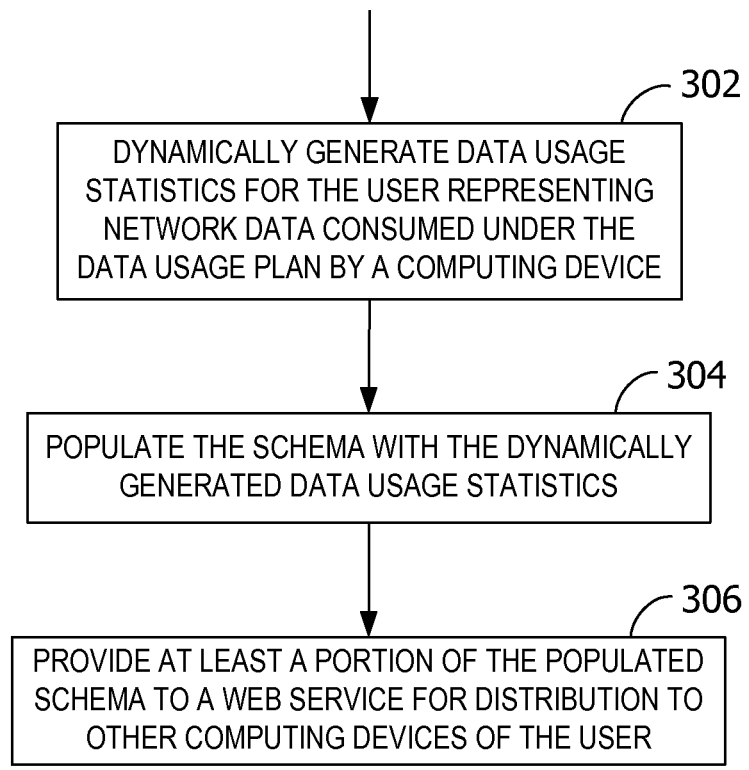
FIG. 3 is an exemplary flow chart illustrating operation of a computing device to populate a schema with statistics about the network data consumed by the computing device under a data usage plan.

Referring next to FIG. 3, an exemplary flow chart illustrates operation of a computing device to populate the schema 116 with statistics about the network data consumed by the computing device under the data usage plan. While next described with reference to the mobile computing device 102 executing the operations illustrated in FIG. 3, the operations may also be executed by the other computing devices 106 of the user 104.

At 302, the mobile computing device 102 dynamically generates the data usage statistics 120 for the user 104. For example, the mobile computing device 102 collects ongoing usage data relating to network data transfers, such as from device radios, drivers, and accelerometers. The collected usage data includes, for example, the amount of data consumed, the time and date of usage, the location of usage, network interface used, the SIM card or other user identity module used for dual SIM scenarios, the international mobile station equipment identity (IMEI) or other device identifier for multi-device scenarios, the IP or other address of the access point used for Wi-Fi scenarios, the IP or other address of the target computer (e.g., for whitelist/blacklists in data usage), and the application responsible for the data transfer.

At 304, the mobile computing device 102 populates the schema 116 (e.g., stored in the memory area 112) with the dynamically generated data usage statistics 120. At 306, the mobile computing device 102 provides at least a portion of the populated schema 116 to the web service 108 for distribution to the other computing devices 106 of the user 104. Alternatively or in addition, the mobile computing device 102 may distribute the populated schema 116, or a portion thereof, to the other computing devices 106 of the user 104. The mobile computing device 102 may also present the dynamically generated data usage statistics 120 to the user 104 in a user interface of the mobile computing device 102.

The mobile computing device 102 may also send and receive portions of the schema 116 representing the data usage plan. For example, the mobile computing device 102 may upload only a portion of the populated schema 116 to the web service 108 at a particular time or during a particular time interval. As another example, the mobile computing device 102 may download only a portion of the schema 116 from the web service 108 at a particular time or during a particular time interval.

In some embodiments, the mobile computing device 102 executes the computer-executable components illustrated in FIG. 1 to implement one or more of the operations illustrated in FIG. 3. For example, the collection component 122, when executed by the processor 110, causes the processor 110 to dynamically generate the data usage statistics 120. The data structure component 124, when executed by the processor 110, causes the processor 110 to populate the schema 116 with the data usage statistics 120 dynamically generated by the collection component 122. The communications interface component 126, when executed by the processor 110, causes the processor 110 to transmit the schema 116 populated by the data structure component 124 to the web service 108 for distribution to the other computing devices 106 of the user 104. The communications interface component 126 may also receive the schema 116 populated with details of the data usage plan from the web service 108 and/or from the mobile operator 111. The communications interface component 126 may also receive updated versions of the schema 116, or portions thereof.

The user interface component 128, when executed by the processor 110, causes the processor 110 to display the data usage statistics 120 dynamically generated by the collection component 122 to the user 104. For example, the user interface component 128 may display data usage and a trending analysis.

Figure 4:
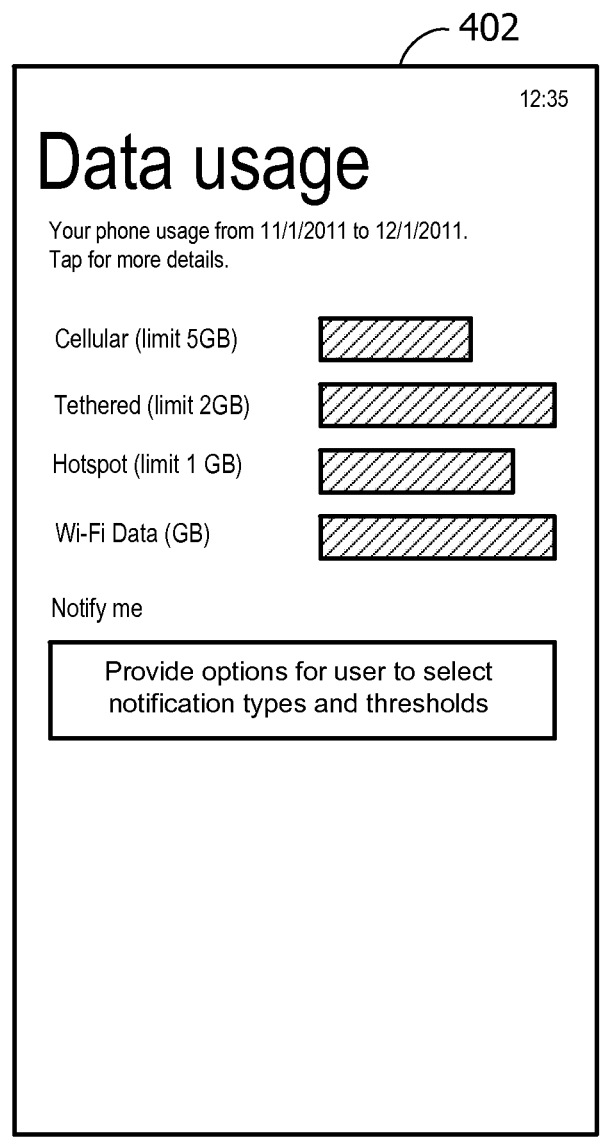
FIG. 4 is an exemplary user interface illustrating a summary of network data usage with different types of network connections.

Referring next to FIG. 4, an exemplary user interface 402 illustrates a summary of network data usage with different types of network connections 130. While the proportions of the user interfaces 402, 502, 504, 506 illustrated in FIG. 4, FIG. 5A, FIG. 5B, FIG. 5C, and FIG. 6 are shown to conform to a screen of the mobile computing device 102 (e.g., a mobile telephone), the content displayed within the user interfaces 402, 502, 504, 506 may be shown in any format on any of the user computing devices.

In FIG. 4, data usage for a plurality of the network connections 130 is shown to the user 104 in the user interface 402. In particular, data usage statistics 120 attributed to each of the network connections 130 is shown. For example, the amounts of data transmitted and/or received over a cellular network connection, a tethered network connection, a Hotspot network connection, and a Wi-Fi network connection are shown. The amounts of data are represented by proportionally-sized horizontal bars.

The user interface 402 also displays the threshold values 118 associated with each of the network connections 130. The threshold values 118 are taken from the data usage plan. For example, the data usage plan indicates that the user 104 has a maximum of 5 gigabytes (GB) of data usage available for the cellular network connection, 2 GB of data usage for the tethered network connection, 1 GB of data usage for the Hotspot network connection, and an unlimited amount of data usage for the Wi-Fi network connection.

The user interface 402 in FIG. 4 may also display a button or bar that, when selected by the user 104 (e.g., clicked or touched), the user interface 402 allows the user 104 to select options or other configuration settings for receiving notifications. The notifications are sent when the amounts of data transmitted and/or received over the various network connections 130 reaches particular values (e.g., set by the user 104, mobile computing device 102, mobile operator 111, or other entity).

Referring next to FIG. 5A, an exemplary user interface 502 illustrates data usage by the mobile computing device 102 consuming network data under the data usage plan having a monthly limit. While the overviews of data usage illustrated in FIG. 5A, FIG. 5B, and FIG. 5C indicate that the data usage statistics 120 shown are per application, the user interfaces 502, 504, 506 may alternatively or in addition display an overview of aggregated data usage across the applications 114 on the mobile computing device 102. Further, the user interfaces 502, 504, 506 may alternatively or in addition display an overview of data usage per computing device of the user 104 or aggregated across a plurality of the computing devices of the user 104. For example, the different statistics may be shown in different tabs or tiles in the user interface. In an example involving a family or shared data plan, the statistics for each plan member may be shown in separate tiles.

In FIG. 5A, the data usage statistics 120 include the amount of network data consumption remaining for use (e.g., the remainder of the monthly limit specified by the data usage plan), the amount of network data consumption used during the current billing period, and the quantity of time (e.g., days) remaining within the current billing period. The data usage statistics 120 also indicate a breakout of the data usage, such as the amount of data consumed under a cellular network connection versus the amount of data consumed under a Wi-Fi network connection.

Referring next to FIG. 5B, an exemplary user interface 504 illustrates data usage by the mobile computing device 102 consuming network data under a pay-as-you-go data usage plan. In FIG. 5B, the data usage statistics 120 include the amount of network data consumption remaining for use (e.g., the remainder of the pay-as-you-go amount specified by the data usage plan), the amount of network data consumed recently (e.g., within the last 30 days), and the quantity of time (e.g., days) remaining For example, the remaining bandwidth (e.g., data consumption) expires in 16 days. The data usage statistics 120 also indicate a breakout of the data usage, such as the amount of data consumed under a cellular network connection versus the amount of data consumed under a Wi-Fi network connection.

Referring next to FIG. 5C, an exemplary user interface 506 illustrates data usage by the mobile computing device 102 consuming network data under the data usage plan with unlimited data usage. In FIG. 5C, the data usage statistics 120 include the amount of network data consumed recently (e.g., within the last 30 days). The data usage statistics 120 also indicate a breakout of the data usage, such as the amount of data consumed under a cellular network connection versus the amount of data consumed under a Wi-Fi network connection. The data usage statistics 120 also indicate a total amount of usage by the mobile computing device 102.

Figure 6:
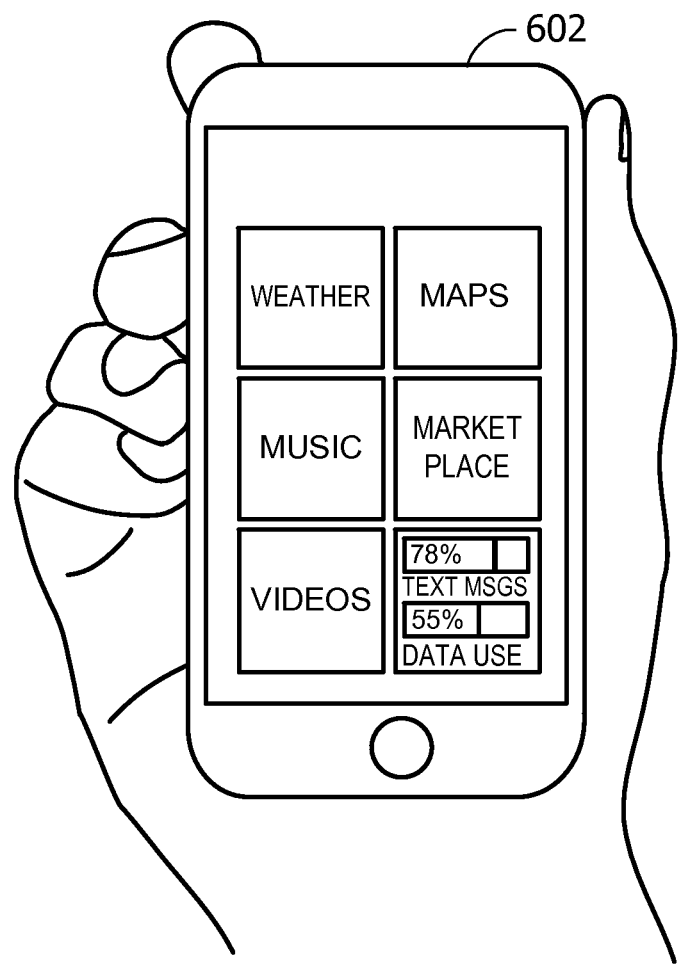
FIG. 6 is an exemplary block diagram illustrates a mobile computing device having a tile for displaying network data usage statistics to a user.

Referring next to FIG. 6, an exemplary block diagram illustrates the mobile computing device 102 as a mobile telephone 602 having a tile for displaying the data usage statistics 120 to the user 104. The mobile telephone 602 displays a plurality of tiles (e.g., active tiles) that may be updated with the data usage statistics 120. In some embodiments, tiles represent tile user interface elements. In the example of FIG. 6, the mobile telephone 602 indicates that 78% of the allotment for text messages has been consumed, while 55% of the allotment for data usage has been consumed.

Further, any of the tiles displaying the data usage statistics 120 may be pinned to a home screen of the mobile telephone 602 to enable the user 104 to instantly view whether data is being consumed, how much data has been consumed, how the data is being consumed, and how much data remains available under the data usage plan.

Additional Examples

In an example scenario, the user 104 has a 750 megabyte (MB) monthly data usage plan for the mobile computing device 102. The user 104 views the data usage plan in the user interface of the mobile computing device 102, and is able to immediately view the threshold values 118, the amount of data currently consumed under the data usage plan, and how much data consumption is remaining and over which of the network connections 130 (e.g., voice, text, data, etc.).

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 2 and FIG. 3 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "roaming" as used herein refers, in some embodiments, to connectivity provided outside a subscriber's home zone that may be subject to additional tariffs, fees, or constraints. Roaming service may or may not be provided by the same mobile operator 111. The term "tethered" as used herein refers, in some embodiments, to situations where one device acts as an access point for another device for network access. A tethered connection may occur over a wired connection or a wireless connection. The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

Embodiments have been described with reference to data monitored and/or collected from users 104. In some embodiments, notice may be provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 104 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for defining the schema 116 to describe individual portions of the data usage plan.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Listed below are exemplary schema portions that are operable in aspects of the disclosure. While written in extensible markup language (XML) format, the schema may be implemented in other formats.

```
<?xml version="1.0" encoding="UTF-8"?>
<xs:schema xmlns:xs="Base/v1"
elementFormDefault="qualified"
targetNamespace="CarrierControl/Base/v1">
    <!-- Basic types -->
    <xs:simpleType name="NameType">
        <xs:restriction base="xs:normalizedString">
            <xs:minLength value="1"/>
            <xs:maxLength value="255"/>
            <xs:whiteSpace value="collapse"/>
        </xs:restriction> </xs:simpleType>
    <xs:simpleType name="Priority">
        <xs:restriction base="xs:nonNegativeInteger">
            <xs:maxExclusive value="10"/>
        </xs:restriction>
    </xs:simpleType>
    <xs:simpleType name="GUID">
        <xs:annotation>
            <xs:documentation xml:lang="en"> The representation of a GUID,
generally the id of an element. </xs:documentation>
        </xs:annotation>
        <xs:restriction base="xs:token">
            <xs:pattern value="\{[a-fA-F0-9]{8}-[a-fA-F0-9]{4}-[a-fA-F0-9]{4}-[a-fA-F0-9]{4}-[a-fA-F0-9]{12}\}"/>
        </xs:restriction>
    </xs:simpleType>
    <xs:simpleType name="SubscriberType">
        <xs:restriction base="xs:token">
            <xs:maxLength value="20"/>
            <xs:pattern value="\w+"/>
        </xs:restriction>
    </xs:simpleType>
    <xs:complexType name="CertificateDetails">
        <xs:annotation>
            <xs:documentation> Used to identify a certificate or set of certificates.
SubjectName is compared against the DN provided as the certificate's Subject field, or
against any Name provided in the SubjectAlternativeName extentions of type
DirectoryName. IssuerName is compared against the DN provided as the certificate's
Issuer field, or against any Name provided in the IssuerAlternativeName extentions of
type DirectoryName. </xs:documentation>
```

```
      </xs:annotation>
      <xs:sequence>
        <xs:element name="SubjectName" type="xs:string"/>
        <xs:element name="IssuerName" type="xs:string"/>
      </xs:sequence>
    </xs:complexType>
    <!-- Alias definitions -->
  <xs:element name="AliasList">
    <xs:complexType>
      <xs:sequence>
        <xs:element maxOccurs="unbounded" ref="AliasDefinition"/>
      </xs:sequence>
    </xs:complexType>
  </xs:element>
  <xs:complexType name="AliasDefinitionBaseType">
    <xs:attribute name="Name" type="xs:string"/>
  </xs:complexType>
  <xs:element name="AliasDefinition" type="AliasDefinitionBaseType"
abstract="true"/>
    <!-- Locations -->
  <xs:simpleType name="ProviderNameType">
    <xs:restriction base="xs:normalizedString">
      <xs:minLength value="1"/>
      <xs:maxLength value="20"/>
      <xs:whiteSpace value="collapse"/>
    </xs:restriction>
  </xs:simpleType>
  <xs:simpleType name="ProviderIdType">
    <xs:restriction base="xs:token">
      <xs:pattern value="\d{1,6}"/>
    </xs:restriction>
  </xs:simpleType>
  <xs:complexType name="ProviderType">
    <xs:sequence>
      <xs:element name="ProviderID" type="ProviderIdType"/>
      <xs:element name="ProviderName" type="ProviderNameType"/>
    </xs:sequence>
  </xs:complexType>
  <xs:complexType name="LocationType">
    <xs:choice maxOccurs="unbounded">
      <xs:element name="Provider" type="ProviderType"/>
      <xs:element name="LocationAlias" type="xs:string"/>
    </xs:choice>
    <xs:attribute name="negate" type="xs:boolean" default="false"/>
  </xs:complexType>
  <xs:element name="LocationAliasDefinition"
type="LocationAliasDefinitionType" substitutionGroup="AliasDefinition"/>
  <xs:complexType name="LocationAliasDefinitionType">
    <xs:complexContent>
      <xs:extension base="AliasDefinitionBaseType">
        <xs:sequence>
          <xs:element name="Location" type="LocationType"/>
        </xs:sequence>
      </xs:extension>
    </xs:complexContent>
  </xs:complexType>
    <!-- Times -->
  <xs:complexType name="TimeType">
    <xs:choice maxOccurs="unbounded">
      <xs:element name="TimePeriod" type="TimePeriod"/>
      <xs:element name="RecurringTimePeriod"
type="RecurringTimePeriod"/>
      <xs:element name="TimeAlias" type="xs:string"/>
    </xs:choice>
    <xs:attribute name="negate" type="xs:boolean" default="false"/>
  </xs:complexType>
  <xs:element name="TimeAliasDefinition" type="TimeAliasDefinitionType"
substitutionGroup="AliasDefinition"/>
  <xs:complexType name="TimeAliasDefinitionType">
    <xs:complexContent>
      <xs:extension base="AliasDefinitionBaseType">
        <xs:sequence>
          <xs:element name="Time" type="TimeType"
maxOccurs="unbounded"/>
        </xs:sequence>
      </xs:extension>
    </xs:complexContent>
  </xs:complexType>
  <xs:simpleType name="TimeOfWeek">
```

```
<xs:annotation>
    <xs:documentation> Defines a time as an offset from the midnight
preceding 12:00:01 AM Sunday (P0D) to the midnight following 11:59:59 PM
Saturday (P7D). </xs:documentation>
    </xs:annotation>
    <xs:restriction base="xs:duration">
        <xs:minInclusive value="P0D"/>
        <xs:maxInclusive value="P7D"/>
    </xs:restriction>
</xs:simpleType>
<xs:complexType name="RecurringTimePeriod">
    <xs:annotation>
        <xs:documentation> Defines a period of time within the week as a
start/end TimeOfWeek. If EndTime is less than StartTime, the period is interpreted as
crossing Saturday night. </xs:documentation>
    </xs:annotation>
    <xs:attribute name="StartTime" type="TimeOfWeek" use="required"/>
    <xs:attribute name="EndTime" type="TimeOfWeek" use="required"/>
</xs:complexType>
<xs:complexType name="TimePeriod">
    <xs:annotation>
        <xs:documentation> Defines a period of time as a start/end date and time.
</xs:documentation>
    </xs:annotation>
    <xs:attribute name="StartTime" type="xs:dateTime" use="required"/>
    <xs:attribute name="EndTime" type="xs:dateTime" use="required"/>
</xs:complexType>
</xs:schema>
<?xml version="1.0" encoding="UTF-8"?>
<xs:schema xmlns:base="Base/v1"
elementFormDefault="qualified"
targetNamespace=" CarrierControl/Plans/v1">
    <xs:import schemaLocation="Alias.xsd"
        namespace="CarrierControl/Base/v1"/>
    <!-- Plan Definition -->
    <xs:complexType name="BillingCycleType">
        <xs:attribute name="StartDate" use="required" type="xs:dateTime"/>
        <xs:attribute name="Duration" use="required">
            <xs:simpleType>
                <xs:restriction base="xs:duration">
                    <xs:minExclusive value="PT0S"/>
                </xs:restriction>
            </xs:simpleType>
        </xs:attribute>
        <xs:attribute name="Resets" type="xs:boolean" default="true"/>
    </xs:complexType>
    <xs:simpleType name="CostStyleType">
        <xs:annotation>
            <xs:documentation> CostType expresses the incremental cost of a plan: -
Unrestricted: There is no incremental cost for consumption on this plan - Fixed:
Consumption goes against a quota which the user has purchased / agreed to purchase -
Variable: The user will be billed for incremental usage on this plan
</xs:documentation>
        </xs:annotation>
        <xs:restriction base="xs:string">
            <xs:enumeration value="Unrestricted"/>
            <xs:enumeration value="Fixed"/>
            <xs:enumeration value="Variable"/>
        </xs:restriction>
    </xs:simpleType>
    <xs:element name="Plan">
        <xs:complexType>
            <xs:sequence>
                <xs:element minOccurs="0" ref="Description"/>
                <xs:element minOccurs="0" ref="Usage"/>
            </xs:sequence>
            <xs:attribute name="Name" use="required" type="xs:string"/>
        </xs:complexType>
    </xs:element>
    <xs:element name="Description" type="DescriptionBaseType" abstract="true"/>
    <xs:complexType name="DescriptionBaseType">
        <xs:sequence>
            <xs:element name="BillingCycle" type="BillingCycleType"
minOccurs="0"/>
            <xs:element name="Conditions" minOccurs="0">
                <xs:complexType>
                    <xs:all>
                        <xs:element name="Location" type="base:LocationType"
minOccurs="0"/>
```

```
                <xs:element name="Time" type="base:TimeType"
minOccurs="0"/>
                <xs:element name="Direction" default="inout"
minOccurs="0">
                    <xs:simpleType>
                        <xs:restriction base="xs:token">
                            <xs:enumeration value="in"/>
                            <xs:enumeration value="out"/>
                            <xs:enumeration value="inout"/>
                        </xs:restriction>
                    </xs:simpleType>
                </xs:element>
                <xs:element name="Destination" minOccurs="0">
                    <xs:complexType>
                        <xs:annotation>
                            <xs:documentation> PhoneNumber only applies to
SMS/Voice plans; HostName only applies to data plans </xs:documentation>
                        </xs:annotation>
                        <xs:sequence>
                            <xs:element name="PhoneNumber"
minOccurs="0">
                                <xs:simpleType>
                                    <xs:restriction base="xs:string">
                                        <xs:pattern value="(\+)?\d+"/>
                                    </xs:restriction>
                                </xs:simpleType>
                            </xs:element>
                            <xs:element name="HostName" minOccurs="0">
                                <xs:simpleType>
                                    <xs:restriction base="xs:anyURI"/>
                                </xs:simpleType>
                            </xs:element>
                        </xs:sequence>
                    </xs:complexType>
                </xs:element>
                <xs:element name="LimitedUsage" minOccurs="0">
                    <xs:annotation>
                        <xs:documentation> For Fixed plans, provides details
on the user's quota: - Limit: The amount of the quota (in minutes for Voice plans,
megabytes for Data plans, and messages for SMS plans) - SharedPlan: Another plan
name whose quota is also consumed by usage on this plan - FallbackPlan: Another
plan name whose consumption begins when this quota is exhausted. If a Fallback Plan
is not provided, the current plan goes into an Overage state. </xs:documentation>
                    </xs:annotation>
                    <xs:complexType>
                        <xs:attribute name="Limit" use="required"
type="xs:nonNegativeInteger"/>
                        <xs:attribute name="SharedPlan" type="xs:string"/>
                        <xs:attribute name="FallbackPlan" type="xs:string"/>
                    </xs:complexType>
                </xs:element>
            </xs:all>
        </xs:complexType>
    </xs:element>
</xs:sequence>
<xs:attribute name="CostStyle" use="required" type="CostStyleType"/>
</xs:complexType>
<xs:complexType name="DataPlanDescriptionType">
    <xs:complexContent>
        <xs:extension base="DescriptionBaseType">
            <xs:sequence>
                <xs:element name="BandwidthInKbps"
type="xs:nonNegativeInteger" minOccurs="0"/>
                <xs:element name="MaxDownloadFileSizeInMegabytes"
type="xs:positiveInteger" default="25" minOccurs="0"/>
                <xs:element name="SecurityUpdatesExempt" type="xs:boolean"
default="false" minOccurs="0"/>
            </xs:sequence>
        </xs:extension>
    </xs:complexContent>
</xs:complexType>
<xs:element name="DataPlanDescription" type="DataPlanDescriptionType"
substitutionGroup="Description"/>
<xs:complexType name="SmsPlanDescriptionType">
    <xs:complexContent>
        <xs:extension base="DescriptionBaseType"/>
    </xs:complexContent>
</xs:complexType>
<xs:element name="SmsPlanDescription" type="SmsPlanDescriptionType"
```

```
substitutionGroup="Description"/>
  <xs:complexType name="VoicePlanDescriptionType">
    <xs:complexContent>
      <xs:extension base="DescriptionBaseType"/>
    </xs:complexContent>
  </xs:complexType>
  <xs:element name="VoicePlanDescription" type="VoicePlanDescriptionType"
substitutionGroup="Description"/>
  <xs:element name="Usage" type="PlanUsageType"/>
  <xs:complexType name="PlanUsageType">
    <xs:attribute name="PlanName" use="required" type="xs:string"/>
    <xs:attribute name="OverLimit" type="xs:boolean"/>
    <xs:attribute name="Congested" type="xs:boolean"/>
    <xs:attribute name="CurrentUsage" use="required"
type="xs:nonNegativeInteger"/>
    <xs:attribute name="UsageTimestamp" use="required" type="xs:dateTime"/>
  </xs:complexType>
</xs:schema>
```

What is claimed is:

1. A system comprising:
a memory area associated with a mobile computing device, said memory area storing a schema representing a data usage plan associated with a user, the data usage plan describing threshold values associated with network connections of one or more computing devices of the user, the network connections being categorized based on types of network traffic data; and
a processor programmed to:
dynamically generate data usage statistics for the user, the data usage statistics representing network data consumed under the data usage plan by a mobile computing device, the data usage statistics being dynamically generated, at the mobile computing device, by collecting the network data consumed by a plurality of components of the mobile computing device;
populate the schema stored in the memory area with the dynamically generated data usage statistics; and
provide at least a portion of the populated schema to a web service for distribution to other computing devices of the user.

2. The system of claim 1, further comprising a user interface, and wherein the processor is further programmed to present the dynamically generated data usage statistics to the user in the user interface.

3. The system of claim 1, wherein the processor is programmed to dynamically generate the data usage statistics by attributing the network data consumed to the corresponding network connections.

4. The system of claim 1, wherein the threshold values correspond to maximum data consumption allotted under the data usage plan for the network connections, wherein the types of network traffic data for the network connections categorization are selected from a group consisting of voice, text, and data.

5. The system of claim 1, wherein the processor is further programmed to upload only a portion of the schema stored in the memory area to the web service at a particular time.

6. The system of claim 1, wherein the processor is further programmed to download only a portion of the schema from the web service at a particular time.

7. The system of claim 1, wherein the schema comprises an extensible markup language schema.

8. The system of claim 1, wherein each of the threshold values correspond to one of a plurality of fields.

9. The system of claim 1, wherein the schema includes a plurality of fields each comprising one or more of the following: peak times, off-peak times, peak time data consumption quota, off-peak time data consumption quota, peak time data consumption remaining, off-peak time data consumption remaining, a roaming rate, a mobile operator name, a billing cycle type, and a network connection type.

10. The system of claim 1, further comprising means for defining the schema to describe individual portions of the data usage plan.

11. A method comprising:
dynamically generating data usage statistics for a user, the data usage statistics representing network data consumed under a data usage plan by a mobile computing device, the data usage statistics being dynamically generated, at the mobile computing device, by collecting the network data consumed by a plurality of components of the mobile computing device, the data usage plan being associated with the user and describing threshold values associated with network connections of one or more computing devices of the user, the network connections being categorized based on types of network traffic data;
populating a schema representing the data usage plan with the dynamically generated data usage statistics; and
providing at least a portion of the populated schema to a web service for distribution to other computing devices of the user.

12. The method of claim 11, further comprising downloading only a portion of the schema from the web service at a particular time.

13. The method of claim 11, further comprising uploading only a portion of the schema to the web service at a particular time.

14. The method of claim 11, wherein the data usage statistics are dynamically generated by attributing the network data consumed to the corresponding network connections.

15. The method of claim 11, wherein the threshold values correspond to maximum data consumption allotted under the data usage plan for the network connections, wherein the types of network traffic data for the network connections categorization are selected from a group consisting of voice, text, and data.

16. The method of claim 11, wherein the schema comprises an extensible markup language schema.

17. One or more computer storage media embodying computer-executable components, said components comprising:
a collection component that when executed causes at least one processor to dynamically generate data usage statistics for a user, the data usage statistics representing network data consumed under a data usage plan associated with the user by a mobile computing device, the data usage statistics being dynamically generated, at the mobile computing device, by collecting the network data consumed by a plurality of components of the mobile computing device;

a data structure component that when executed causes at least one processor to populate a schema representing the data usage plan with the data usage statistics dynamically generated by the collection component, the data usage plan describing threshold values associated with network connections of the one or more computing devices of the user, the network connections being categorized based on types of network traffic data; and a communications interface component that when executed causes at least one processor to provide at least a portion of the schema populated by the data structure component to a web service for distribution to other computing devices of the user.

18. The computer storage media of claim 17, wherein the schema includes a plurality of fields each comprising one or more of the following: peak times, off-peak times, peak time data consumption quota, off-peak time data consumption quota, peak time data consumption remaining, off-peak time data consumption remaining, a roaming rate, a mobile operator name, a billing cycle type, and a network connection type.

19. The computer storage media of claim 17, further comprising a user interface component that when executed causes at least one processor to present the data usage statistics dynamically generated by the collection component to the user.

20. The computer storage media of claim 17, wherein each of the threshold values correspond to one of a plurality of fields.

* * * * *